US011010055B2

(12) United States Patent
Duncan et al.

(10) Patent No.: US 11,010,055 B2
(45) Date of Patent: *May 18, 2021

(54) COMMAND PROCESSING FOR A STORAGE SYSTEM

(71) Applicant: Micron Technology, Inc., Boise, ID (US)

(72) Inventors: Kevin R. Duncan, Ramsey, MN (US); Terry M. Cronin, Ham Lake, MN (US)

(73) Assignee: Micron Technology, Inc., Boise, ID (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/455,282

(22) Filed: Jun. 27, 2019

(65) Prior Publication Data

US 2019/0317668 A1 Oct. 17, 2019

Related U.S. Application Data

(63) Continuation of application No. 15/879,054, filed on Jan. 24, 2018, now Pat. No. 10,365,826.

(51) Int. Cl.
*G06F 3/06* (2006.01)
(52) U.S. Cl.
CPC .......... *G06F 3/0607* (2013.01); *G06F 3/068* (2013.01); *G06F 3/0634* (2013.01); *G06F 3/0659* (2013.01); *G06F 3/0664* (2013.01)
(58) Field of Classification Search
CPC ........ G06F 3/067; G06F 3/061; G06F 3/0659; G06F 11/0751; G06F 11/20; G06F 11/3034; G06F 13/404; G06F 13/4282; H04L 43/12; H04L 41/0213; H04L 43/0817

USPC ............ 370/338, 331, 401; 709/224; 710/62
See application file for complete search history.

(56) References Cited

U.S. PATENT DOCUMENTS

| 5,172,372 | A | * | 12/1992 | Konishi | ............. H04L 12/4604 370/401 |
| 5,850,567 | A | | 12/1998 | Young | |
| 7,116,675 | B2 | | 10/2006 | Tateoka | |
| 7,158,511 | B2 | * | 1/2007 | Payton | ................ H04L 12/1854 370/389 |
| 8,495,252 | B2 | | 7/2013 | Lais et al. | |
| 8,589,723 | B2 | | 11/2013 | Kumar et al. | |
| 8,707,090 | B2 | | 4/2014 | Akutsu | |
| 8,892,962 | B2 | | 11/2014 | Iwanaga | |
| 9,317,317 | B2 | | 4/2016 | Graham et al. | |
| 9,459,908 | B2 | | 10/2016 | Anand et al. | |

(Continued)

FOREIGN PATENT DOCUMENTS

WO        2014015409        1/2014

*Primary Examiner* — Faisal M Zaman
(74) *Attorney, Agent, or Firm* — Brooks, Cameron & Huebsch, PLLC

(57) ABSTRACT

A command from a host is received via a port of a storage system. The port is assigned a current port revision identifier. The current port revision identifier of the port is associated with the command. Responsive to a status change associated with the port, an updated port revision identifier is assigned to the port to replace the current port revision identifier of the port and execution of the command is aborted responsive to determining that the current port revision identifier associated with the command is different than the updated port revision identifier of the port.

20 Claims, 5 Drawing Sheets

(56) References Cited

U.S. PATENT DOCUMENTS

| | | | |
|---|---|---|---|
| 10,365,826 B1* | 7/2019 | Duncan | G06F 3/061 |
| 2004/0008653 A1* | 1/2004 | Cohen | H04L 61/2514 |
| | | | 370/338 |
| 2007/0204069 A1 | 8/2007 | Bhesania | |
| 2008/0008200 A1* | 1/2008 | Jeong | H04L 47/70 |
| | | | 370/401 |
| 2012/0014350 A1* | 1/2012 | Kim | H04W 36/0022 |
| | | | 370/331 |
| 2013/0097600 A1 | 4/2013 | Cardona | |
| 2013/0166797 A1 | 6/2013 | Komikado | |
| 2013/0198396 A1 | 8/2013 | Scherer | |
| 2014/0258684 A1 | 9/2014 | Hastie | |
| 2014/0297355 A1 | 10/2014 | Ohashi | |
| 2015/0371684 A1 | 12/2015 | Mataya | |
| 2016/0080261 A1 | 3/2016 | Koponen | |

* cited by examiner

COMMAND PROCESSING FOR A STORAGE SYSTEM

PRIORITY INFORMATION

This application is a Continuation of U.S. application Ser. No. 15/879,054, filed on Jan. 24, 2018, the contents of which are incorporated herein by reference.

TECHNICAL FIELD

The present disclosure relates generally to storage systems, and more particularly, to command processing for a storage system.

BACKGROUND

A storage device may include one or more memory components that store data. For example, a solid-state drive (SSD) may include memory devices such as non-volatile memory devices. The storage device may further include a storage device controller that may manage each of the memory devices and allocate data to be stored at the memory devices. A host system may utilize the storage device, and write data to and/or request data from the storage device. The storage device controller may be used to retrieve data from the corresponding memory devices and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to command processing for a storage system. An example of a storage system is a solid-state drive (SSD). An SSD can include multiple interface connections to one or more host systems (hereinafter referred to as hosts). The interface connections can be referred to as ports. A host can send data commands (e.g., read, write, erase, program, etc.) to the SSD via a port.

An SSD can be capable of pipelined command execution in which multiple data commands, received from one or more hosts, are executed, in parallel, on the SSD. Changes in the states of hosts can affect performance of the SSD. For example, a disconnection (intentionally or unintentionally) of a host from an SSD port can cause the port to be associated with a disconnected status, which can leave commands and/or corresponding data "in flight." Further processing of such commands and/or data can unnecessarily constrain SSD performance by wasting processing resources of the SSD since the requesting host is no longer connected to the SSD. In conventional storage systems, the SSD may continue executing data commands currently in process even though the corresponding data command responses will be undeliverable to the now respective disconnected host.

Aspects of the present disclosure address the above and other deficiencies by proactively identifying data commands associated with a status change and preventing completion of the operation of the respective data commands. For instance, commands and/or corresponding data "in flight" can be purged (e.g., deleted) from the SSD such that stale commands and/or data associated with the stale commands are not processed further by the SSD. Resource consumption of the SSD can be reduced and performance of the SSD improved because stale commands (e.g., commands associated with a host that has failed or otherwise disconnected from the SSD) may be purged prior to completion, thereby reducing an amount of processing and/or memory resources consumed by the SSD.

Figure 1:
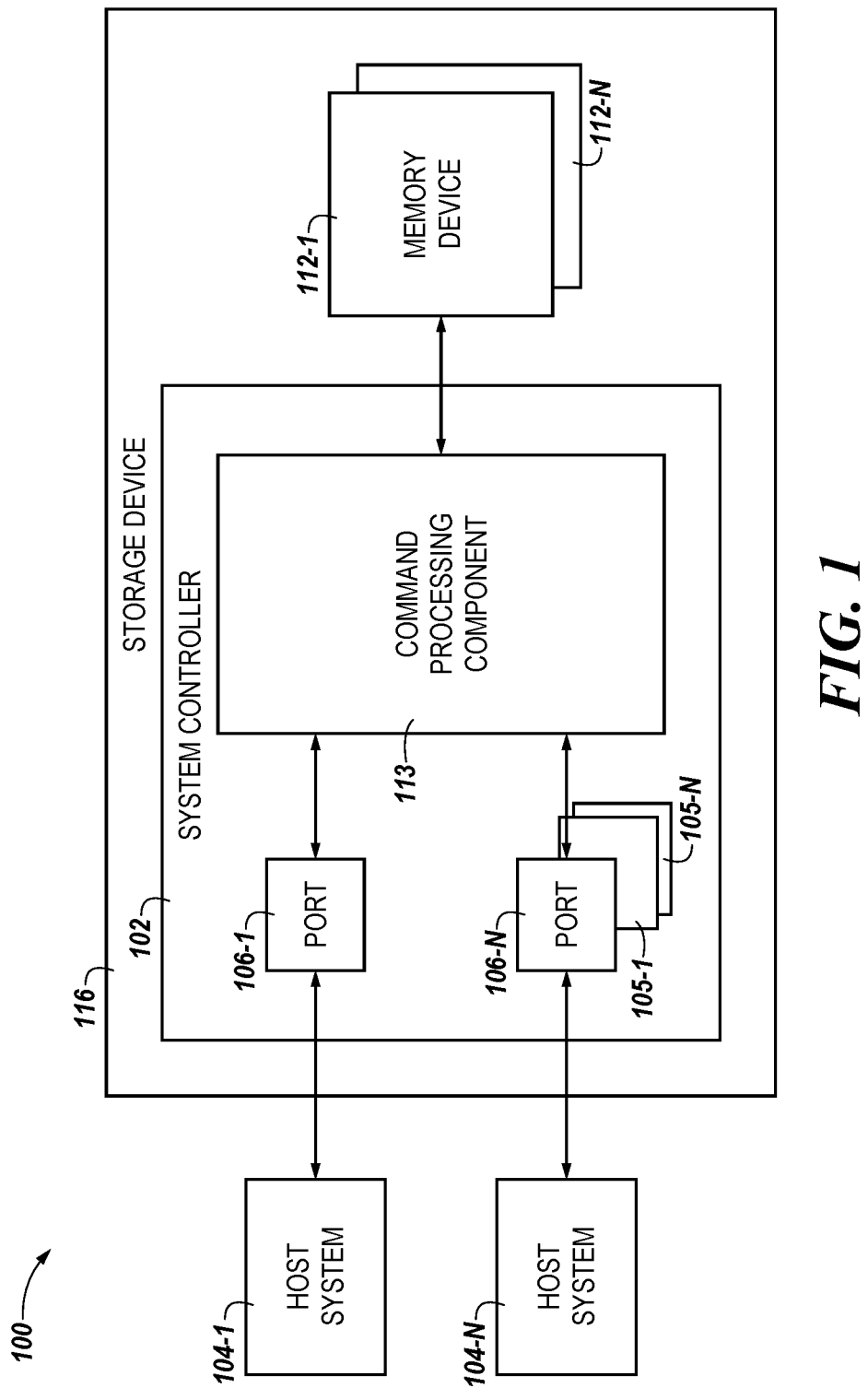
FIG. 1 illustrates an example computing system that includes a storage device, in accordance with some embodiments of the present disclosure.

FIG. 1 illustrates an example computing system 100 that includes a storage device, in accordance with some embodiments of the present disclosure. An example of a storage device 116 is an SSD. The computing system 100 can include one or more host systems (e.g., host system 104-1 to host system 104-N). One or more host systems are also hereinafter referred to as host 104. The host 104 can be a computing device such as a desktop computer, laptop computer, network server, mobile device, or such computing device that includes a memory and a processing device. The host 104 can include or be coupled to the storage device 116. The host 104 can write data to the storage device 116 and/or read data from the storage device 116.

The storage device 116 can include memory devices 112-1 to 112-N. In some embodiments, the memory devices 112-1 to 112-N may be based on non-volatile memory. For example, the memory devices 112-1 to 112-N may be a negative-and (NAND) type flash memory. Each of the memory devices 112-1 to 112-N may include one or more arrays of memory cells such as single level cells (SLCs), multi-level cells (MLCs), or quad-level cells (QLCs). Each of the memory cells may store bits of data (e.g., data blocks) used by the host system 120. Although non-volatile memory devices such as NAND type flash memory are described, the memory devices 112-1 to 112-N may be based on any other type of memory. For example, the memory devices 112-1 to 112-N may be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, and electrically erasable programmable read-only memory (EEPROM). Furthermore, the memory cells of the memory devices 112-1 to 112-N may be grouped as memory pages or data blocks that may refer to a unit of the memory device used to store data.

The host 104 can be coupled to the storage device 116 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host 104 and the storage device 116. The host 104 may further utilize an NVM Express (NVMe) interface protocol to access the memory devices 112-1 to 112-N when the storage device 116 is coupled with the host 104 by the PCIe interface.

The host 104 can send one or more commands (e.g., read, write, erase, program, etc.) to the storage device 116 via one or more ports (e.g., port 106-1 to port 106-N) on the storage device 116. The one or more ports are also hereinafter referred to as port 106. Port 106 of the storage device 116 can communicatively couple the storage device 116 to the host 104 via communication link (e.g., a cable, bus, etc.) to establish a respective command path for a host 104.

The storage device 116 can be capable of pipelined command execution in which multiple commands are executed, in parallel, on the storage device 116. The storage device 116 can have multiple command paths (hereinafter referred to as paths) to the memory devices 112-1 to 112-N. For example, the storage device 116 may be a multi-channel storage device that may have multiple physical PCI Express (PCIe) paths to the memory devices 112-1 to 112-N. In another example, the storage device 116 may use single root input/output virtualization (SR-IOV) with multiple virtual functions (VFs) that act as multiple logical paths to the memory devices 112-1 to 112-N.

SR-IOV is a specification that enables the efficient sharing of PCIe devices among virtual machines. A single physical PCIe can be shared on a virtual environment using the SR-IOV specification. The storage device 116 can be a PCIe device that is SR-IOV-enabled and can appear as multiple, separate physical devices, each with its own PCIe configuration space. With SR-IOV, a single I/O resource, which is known as a physical function, can be shared by many virtual machines. An SR-IOV virtual function is a PCI function that is associated with an SR-IOV physical function. A virtual function is a lightweight PCIe function that shares one or more physical resources with the physical function and with virtual functions that are associated with that physical function. Each SR-IOV device can have a physical function and each physical function can have one or more virtual functions associated with it. The virtual functions are created by the physical function.

In some embodiments, the storage device 116 includes multiple physical paths and/or multiple virtual functions that provide access to a same storage medium (e.g., memory devices 112) of the storage device 116. In some embodiments, the port 106-1 and/or the port 106-N are peripheral component interconnect express (PCIe) ports.

In some embodiments, the computing system 100 supports SR-IOV via one or more ports 106-1 to 106-N. In some embodiments, the ports 106-1 to 106-N are physical ports configured to transfer data via a physical function (e.g., a PCIe physical function). In some embodiments, ports 105-1 to 105-N are virtual ports configured to transfer data via a virtual function (e.g., a PCIe virtual function). In such a deployment, a single physical PCIe function (e.g., port 106-N) can be virtualized to support multiple virtual components (e.g., virtual ports such as virtual ports 105-1 to 105-N) that can send and/or receive data via respective virtual functions (e.g., over one or more physical channels which may each be associated with one or more virtual functions).

The storage device 116 can be configured to support multiple connections to, for example, allow for multiple hosts 104-1 to 104-N to be connected to the storage device 116. As an example, in some embodiments, the computing system 100 may be deployed in environments in which one or more hosts 104-1 to 104-N are located in geophysically disparate locations, such as in a software defined data center deployment. For example, host 104-1 may be in one physical location (e.g., in a first geophysical region), host 104-N may be in a second physical location, and/or storage device 116 may be in a third physical location.

As used herein, a "port" may be a physical port or a virtual port. A physical port can be a port configured to send and/or receive data via a physical function. A virtual port can be a port configured to send and/or receive data via a virtual function.

The storage device 116 can include a system controller 102 to communicate with the memory devices 112-1 to 112-N to perform operations such as reading data, writing data, or erasing data at the memory devices 112-1 to 112-N and other such operations. The system controller 102 can include hardware such as one or more integrated circuits and/or discrete components, software such as firmware or other instructions, or a combination thereof. In general, the system controller 102 can receive commands or operations from the host 104 and can convert the commands or operations into instructions or appropriate commands to achieve the desired access to the memory devices 112-1 to 112-N. The system controller 102 can be responsible for other operations such as wear leveling operations, garbage collection operations, error detection and error-correcting code (ECC) operations, encryption operations, caching operations, and address translations between a logical block address and a physical block address that are associated with the memory devices 112-1 to 112-N.

The connection status (e.g., connected, disconnected) between a host 104 and a port 106 can change. A change in connection status (hereinafter referred to as status) can be triggered by, for example, when a host 104 has powered down, ceased transmitting information to the storage device 116, restarted, experienced a failed communication with the storage device 116, or has otherwise experienced a change in status. In another example, a change in status can be caused by a port 106 having connectivity issues with a host 104.

Changes in the status can leave commands, which are being processed to complete a command, and/or corresponding data "in flight," even though the requesting host 104 may no longer be connected to the storage device 116. An "in flight" command is a command being processed and operation(s) for completing the command (e.g., read, write, erase, program) are not yet completed.

The system controller 102 can include a command processing component 113 to proactively identify commands associated with a status change and prevent completion of the operation of the respective commands. Operations by the command processing component 113 can be performed by one or more components of the system controller 102, as described in greater detail below in conjunction with FIG. 2. The command processing component 113 can stop the execution of commands currently in process and/or operations related to the commands. The command processing component 113 can assign each port 106 a port revision identifier. When commands are received at a port 106, the command processing component 113 can tag each command with a corresponding port revision identifier. If a particular host (e.g., host 104-1) changes status, the command processing component 113 can use the tags of the port revision identifiers on the commands to locate "in flight" commands that are associated with the particular host 104-1, and abort such commands, as described in greater detail below in conjunction with FIG. 2 and FIG. 3.

In some embodiments, the system controller 102 (or a portion thereof) may be provided as part of an application specific integrated circuit (ASIC). In some embodiments, the system controller 102 (or a portion thereof) may be provided as part of a field-programmable-gate-array (FPGA).

Figure 2:
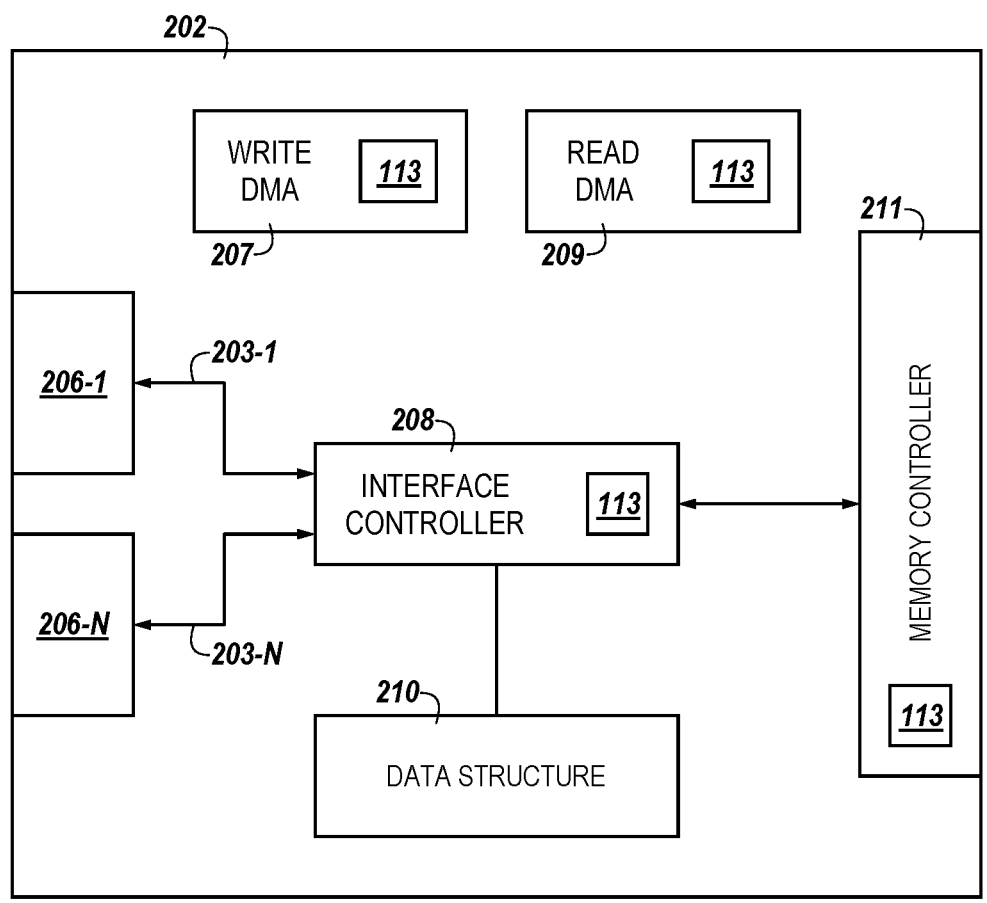
FIG. 2 illustrates an example system controller, in accordance with some embodiments of the present disclosure.

FIG. 2 illustrates an example system controller 202, in accordance with some embodiments of the present disclosure. The system controller 202 can be system controller 102 in FIG. 1 coupled to host 104-1 to host 104-N (hereinafter referred to as host 104) and memory devices 112-1 to 112-N (hereinafter referred to as memory device 112).

The system controller 202 can include a memory controller 211 to control operation of memory device 112. In some embodiments, the memory controller 211 is a flash memory controller, such as a NAND flash controller, or other suitable controller and media.

The system controller 202 can include an interface controller 208, which is communicatively coupled to one or more ports 206 (e.g., port 206-1 to port 206-N). The interface controller 208 can control movement of commands and/or data between host 104 and the memory controller 211. For instance, the interface controller 208 can process commands transferred between the host 104 and the memory device 112 via memory controller 211. In some embodiments, the interface controller 208 is a non-volatile memory express (NVMe) controller. For example, the interface controller 208 may operate in accordance with a logical device interface specification (e.g., protocol), such as the NVMe specification or a non-volatile memory host controller interface specification. Accordingly, in some embodiments, the interface controller 208 can process commands according to the NVMe protocol.

The interface controller 208 can be coupled to the ports 206 via respective command paths (e.g., command path 203-1 to 203-N). Command paths 203-1 to 203-N are also hereinafter referred to as command path 203. Command path 203 can be a physical path (e.g., a wire or wires) that may be configured to pass physical functions and/or virtual functions between the respective port 206 and the interface controller 208 in accordance with the NVMe standard. For example, in an SR-IOV deployment, interface controller 208 can serve as multiple controllers (e.g., NVMe controllers) for respective physical functions and/or each virtual function, such that interface controller 208 provides multiple controller operations.

The interface controller 208 can be coupled to data structure 210. As used herein, a "data structure" refers to a specialized format for organizing and/or storing data, which may or may not be organized in rows and columns. Examples of data structures include arrays, files, records, tables, trees, etc.

Although shown as a single interface controller 208 in FIG. 2, embodiments are not so limited, and the interface controller 208 can comprise multiple sub-controllers and/or multiple controllers. For example, each respective port 206-1 to 206-N may have a separate interface controller coupled thereto.

The system controller 202 can include direct memory access (DMA) components that can allow for the system controller 202 to access main memory of a computing system (e.g., DRAM, SRAM, etc. of host 104 in computing system 100 in FIG. 1). Write DMA 207 and read DMA 209 can facilitate transfer of information between the host 104 and the memory device 112. In at least one embodiment, write DMA 207 facilitates reading of data from the host 104 and writing of data to the memory device 112. The read DMA 209 can facilitate reading of data to the memory device 112 and writing of data to the host 104. In some embodiments, write DMA 207 and/or read DMA 209 reads and writes data via a PCIe connection.

The system controller 202 can include the command processing component 113 of FIG. 1 to proactively identify commands associated with a status change and prevent completion of the operation(s) of the respective commands. The functionality of the command processing component 113 can be implemented by the system controller 202 and/or one or more components (e.g., interface controller 208, memory controller 211, write DMA 207, read DMA 209) within the system controller 202.

The command processing component 113 can assign identification information to each port 206. The identification information for each port can include, for example, a port identifier and a port revision identifier. The command processing component 113 can store the assigned identification information for the ports 206 in the data structure 210.

The system controller 202 can receive commands from the host 104 via ports 206-1 to 206-N. When a command is received, the command processing component 113 can tag each command with identification information (e.g., port identifier, port revision identifier) of the respective port 206, described in greater detail below in conjunction with FIG. 4. It is noted that, in embodiments in which storage device includes a single port, there is no port identifier since there is only one port.

Referring to FIG. 2, the command processing component 113 can monitor a computing system (e.g., computing system 100 in FIG. 1) for any status change of a host 104 and/or port 206. The status change can be related to a host 104, for example, and not limited to, powering down, stopping transmission of information to a storage device (e.g., storage device 116 in FIG. 1), restarting, experiencing a failed communication with the storage device, or has otherwise experienced a change in status. The status change can be related to a port 206 having connectivity issues with a respective host 104.

When the command processing component 113 detects a status change, the command processing component 113 can identify the port 206 associated with the status change and update the identification information (e.g., port revision identifier) for the respective port 206. Updating the port vision identifier is described in greater detail below in conjunction with FIG. 4. Referring to FIG. 2, the command processing component 113 can store the updated identification information for the ports 206 in the data structure 210.

In response to updating identification information (e.g., port revision identifier) of a port 206, the command processing component 113 can identify commands that are "in flight" and are tagged with an outdated (e.g., not updated) port revision identifier, as described in greater detail below in conjunction with FIG. 4.

Referring to FIG. 2, the command processing component 113 can abort any command tagged with an outdated port revision identifier, as described in greater detail below in conjunction with FIG. 4. By aborting execution of (e.g., by deleting, purging, or not executing) commands that are determined to have the outdated port revision identifier assigned thereto, storage device resources, memory resources and/or processing resources can be conserved in comparison with conventional storage systems that do not track identification information, such as port revision identifiers assigned to the port and/or commands received by the port. For clarity, it is noted that the identification information assigned to port 206-1 is not the same as the identification information assigned to port 206-N.

Figure 3:
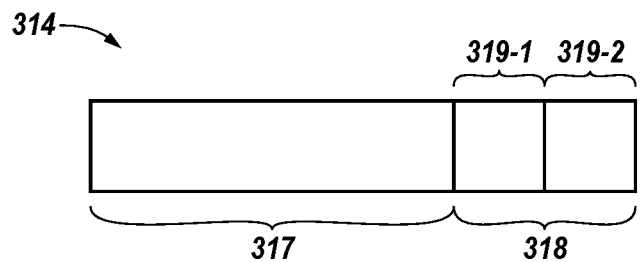
FIG. 3 is block diagram of example of command content of a command, in accordance with some embodiments of the present disclosure.

FIG. 3 is block diagram of example of command content 314 of a command, in accordance with some embodiments of the present disclosure. The command content 314 includes a payload portion 317. The payload portion 317 can include a data pattern corresponding to a particular command, such as a program command, a read command, a write command, or an erase command, among others, which may be processed by a storage system. The payload portion 317 can include command addressing information, such as a logical and/or physical address corresponding to the command.

The command content 314 can include command identifier portion 318. The command identifier 318 can include a port identifier portion 319-1 and a port revision identifier portion 319-2. In some embodiments, the command identifier portion 318 includes only the port identifier portion 319-1 or the port revision identifier portion 319-2.

The port identifier portion 319-1 can include a port identifier. The port identifier can be uniquely defined amongst ports on the storage device. Respective port identifiers can be assigned to ports of a storage device (e.g., storage device 116 in FIG. 1). The port identifier can include one or more characters (e.g., alpha-numeric characters, symbols, etc.). For example, the port identifier may be one or more non-negative integers that are assigned to a particular port. For example, a storage device (e.g., SSD) may have K ports (where K is a non-zero integer), and each port can be assigned a number between zero and K-1 (or a number between one and K). In some embodiments, the respective port identifiers can comprise at least a portion of identification information that is assigned to each respective port. In some embodiments, the port number portion 319-1 is appended to a command to indicate that the command was sent to or received by the particular port.

The port revision identifier portion 319-2 can include a revision identifier assigned to the port that is receiving or responding to commands from a host coupled thereto. The port revision identifier can include one or more characters (e.g., alpha-numeric characters, symbols, etc.). In some embodiments, the port revision identifier portion 319-2 is appended to a command to indicate that the command was sent to or received by the particular port when the particular port had a particular revision identifier assigned thereto.

Figure 4:
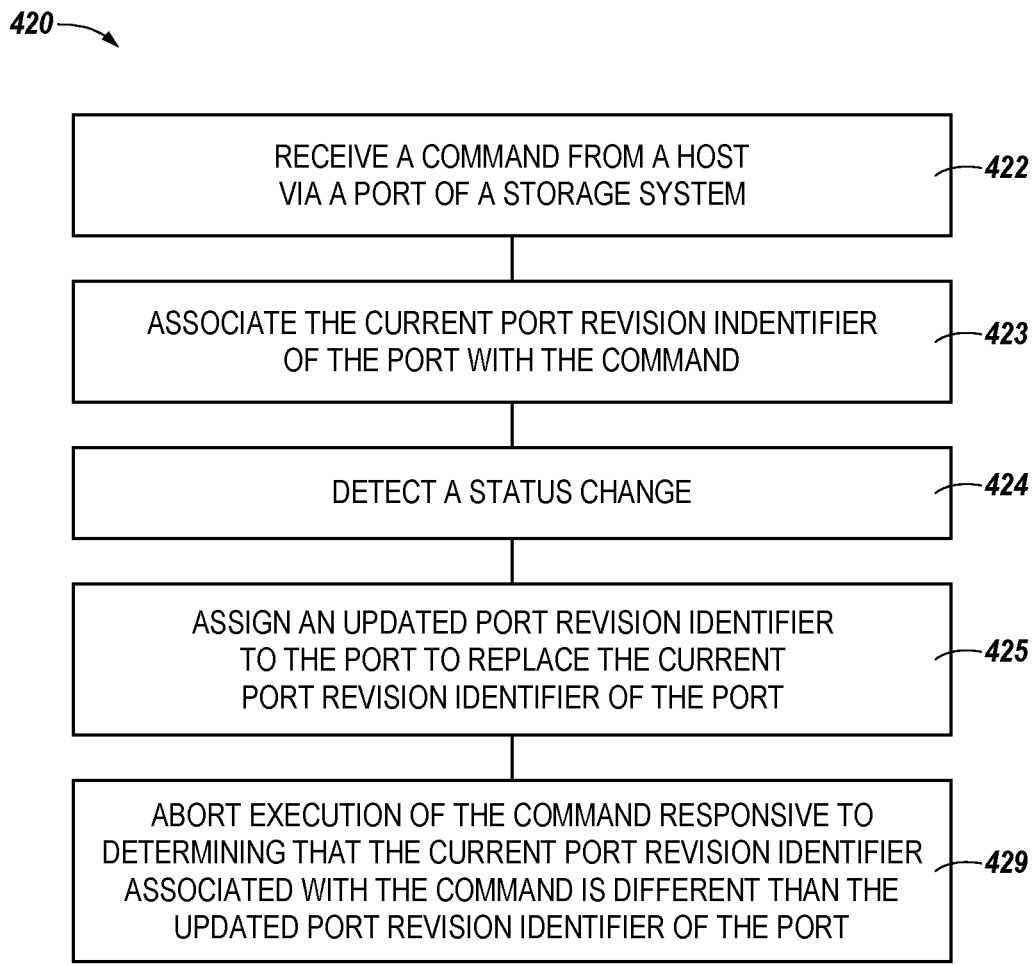
FIG. 4 is a flow diagram of an example method to process commands associated with a status change, in accordance with some embodiments of the present disclosure.

FIG. 4 is a flow diagram of an example method 420 to process commands associated with a status change, in accordance with some embodiments of the present disclosure. The method 420 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 420 may be performed by the command processing component 113 or one or more components of the system controller 102 of FIG. 1.

At block 422, processing logic receives a command from a host via a port of a storage system. The command can be a request for the storage system to perform an operation (e.g., read operation, write operation, program operation, erase operation, etc.) on data at a memory device on the storage system. The storage system can be an SSD. In one embodiment, the storage system is a multi-channel (e.g., dual channel) SSD. In one embodiment, the storage system is enabled to support SR-IOV, and the port is an SR-IOV physical function or virtual function. Current identification information (e.g., a port identifier, a port revision identifier) for the port can be stored in a data structure coupled to the processing device. In some embodiments, the command is received via a logical path coupling the port of the storage system to a non-volatile memory of the storage system. In some embodiments, the command is via a Peripheral Component Interconnect Express (PCIe) command path.

In some embodiments, respective port revision identifiers can be assigned to ports of the storage system, for example, when the storage system is powered on. For example, each port can have, for example, on boot of the storage system, an initial port revision identifier assigned thereto. In some embodiments, the port revision identifier initially assigned to each port is the same. For example, each port may initially have a port revision identifier of zero assigned thereto. In some embodiments, the port revision identifier initially assigned to each port is different. For example, the respective port revision identifiers can comprise at least a portion of identification information (e.g., port identifier) that may be assigned to each respective port.

At block 423, processing logic associates the current port revision identifier of the port with the command. Processing logic can assign the current port revision identifier to the command. Processing logic can also assign the port identifier to the command. In some embodiments, processing logic appends the current port revision identifier and/or port identifier to the command. In some embodiments, processing logic creates an entry in a data structure (e.g., data structure 210 in FIG. 2) of the assignment for the command.

At block 424, the processing logic detects a status change. The status change can be a change in status associated with a host and/or a port. Processing logic may detect that the host has experienced a status change, for example, by determining that the host has disconnected from the SSD, disconnected from a port of the SSD, powered down, ceased transmitting information to the system controller, restarted, has a failed communication with the SSD, or has otherwise experienced a change in status.

Processing logic can monitor the host, port(s), and/or command path(s) to determine that the host has failed, restarted, disconnected, or otherwise experienced a change in status. For example, a system controller (e.g., system controller 102 in FIG. 1) may monitor communications between the interface controller (e.g., interface controller 108 in FIG. 1), the host(s) (e.g., host 104 in FIG. 1), the port(s) 106 (e.g., port 106 in FIG. 1), the memory controller (e.g., memory controller 111 in FIG. 1) and/or the command paths (e.g., paths between hosts and ports, paths between ports and interface controller(s), paths between interface controller(s) and memory controller, etc.) to determine that communications have ceased to result in the status change. Similarly, the processing logic may determine that the host, port, and/or command path have restarted or otherwise become functional again based on communications received from the host, port, and/or along the command path.

At block 425, processing logic assigns an updated port revision identifier to the port to replace the current port revision identifier of the port. In some embodiments, processing logic increments the port revision identifier to create the updated port revision identifier. For example, the port revision identifier may be a number (e.g., integer), and processing logic can increment the number corresponding to the port revision identifier.

In some embodiments, processing logic assigns the updated port revision identifier to the port in response to detecting a status change. The updated port revision identifier for the port can be stored in a data structure coupled to the processing device. In some embodiments, processing logic then assigns the updated port revision identifier to subsequent commands received from the host via the particular port.

At block 429, processing logic aborts execution of the command responsive to determining that the current port revision identifier associated with the command is different than the updated port revision identifier of the port. Processing logic can delete the command and data associated with the command prior to completion of execution of the command. In some embodiments, processing logic deletes the entry of the port revision identifier assignment to the command in a data structure (e.g., data structure 210 in FIG. 2).

In some embodiments, a message indicating that the status associated with the host changed may be transmitted to the host when the host is reconnected. The message may include information indicating that commands transmitted from the host prior to the status of the host changing have been aborted or have otherwise been prevented from being executed.

Figure 5:
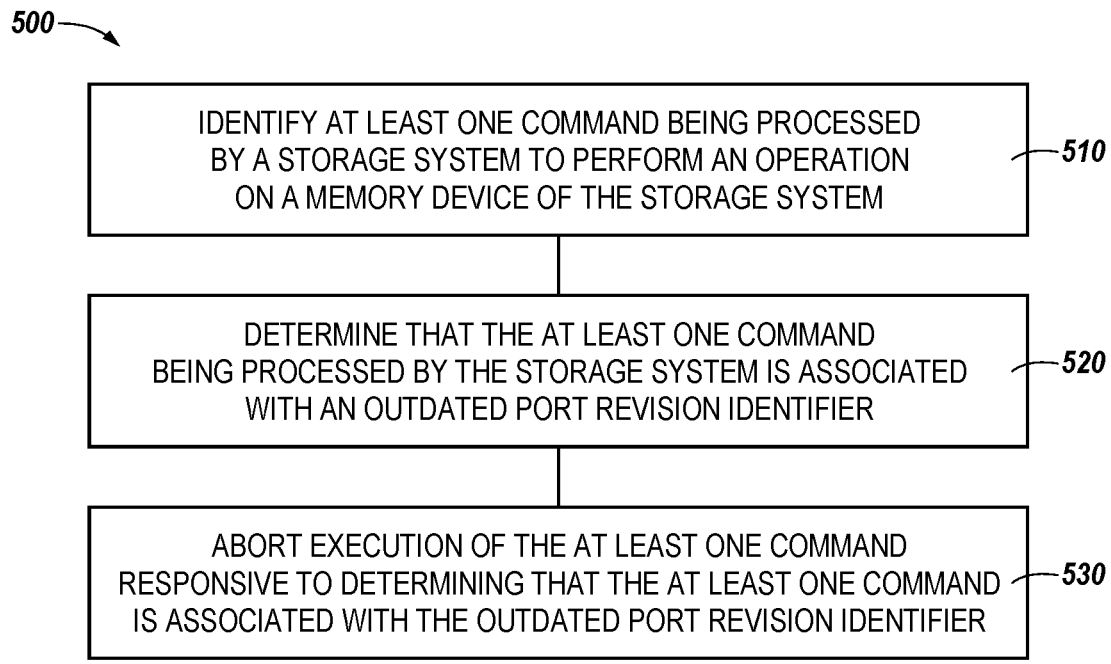
FIG. 5 is a flow diagram of an example method to process commands using port information, in accordance with some embodiments of the present disclosure.

FIG. 5 is a flow diagram of an example method 500 to process commands using port information, in accordance with some embodiments of the present disclosure. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the command processing component 113 or one or more components of the system controller 102 of FIG. 1.

At block 510, processing logic identifies at least one command being processed by a storage system to perform an operation on a memory device of the storage system. The storage system can be an SSD. The memory device can be non-volatile memory. The operation, for a respective command, can be a read operation, write operation, program operation, or erase operation. When a command is being processed by the storage system, the command is "in flight." That is, the storage system has not yet completed the operation (e.g., read, write, program, erase) being requested via the command. The "in flight" command moves along a command path on the storage system. An "in flight" command can be incoming or outgoing. An incoming command can be a command that has yet to perform an operation on the memory device of the storage system. For example, for a read command, the data on the memory device may not yet be retrieved from the memory device. An outgoing command can be a command that is being returned to a host. For example, for a read command, the data on the memory device may have been retrieved from the memory device and is in process of being returned to the host.

As an "in flight" command moves along the command path, the "in flight" command is processed by one or more storage system components, such as a port (e.g., port 106 in FIG. 1), an interface controller (e.g., interface controller 108 in FIG. 1), DMA (e.g., write DMA 207 or read DMA 209 in FIG. 2), and/or memory controller (e.g., memory controller 111 in FIG. 1). One or more components of the storage system can identify one or more "in flight" commands being processed at one or more instances along the command path.

In some embodiments, processing logic identifies the at least one command in response to detecting a status change associated with a host coupled to the storage system. The status change can indicate a disconnect between the host and the storage system.

In some embodiments, processing logic identifies the at least one command is in response to assigning a new port revision identifier to a port. The new port revision identifier can be assigned to the port in response to detecting a status change.

At block 520, processing logic determines that the at least one command being processed by the storage system is associated with an outdated port revision identifier. Processing logic can identify a port revision identifier assigned to the at least one command. In some embodiments, the port revision identifier assigned to the at least one command is appended to the at least one command.

Processing logic can determine which port of the storage system received the command. In some embodiments, the port identifier of the port that received the command is appended to the command. Processing logic can determine the port revision identifier that is currently assigned to the port from an entry in a data structure by using the port identifier associated with the at least one command as a lookup index.

Processing logic can compare the port revision identifier assigned to the at least one command to a port revision identifier assigned to a port of the storage system. An outdated port revision identifier is an identifier that does not match the port revision identifier that is currently assigned to a corresponding port. If the port revision identifier assigned to the command matches the port revision identifier that is currently assigned to a corresponding port, the port revision identifier assigned to the command is an updated port revision identifier. If the port revision identifier assigned to the command does not match the port revision identifier that is currently assigned to a corresponding port, the port revision identifier assigned to the command is an outdated port revision identifier.

At block 530, processing logic aborts execution of the at least one command responsive to determining that the at least one command is associated with the outdated port revision identifier. For example, processing logic can stop execution of the at least one command and/or delete the at least one command. Aborting the at least one command can reduce the overall resource consumption of the storage system.

Figure 6:
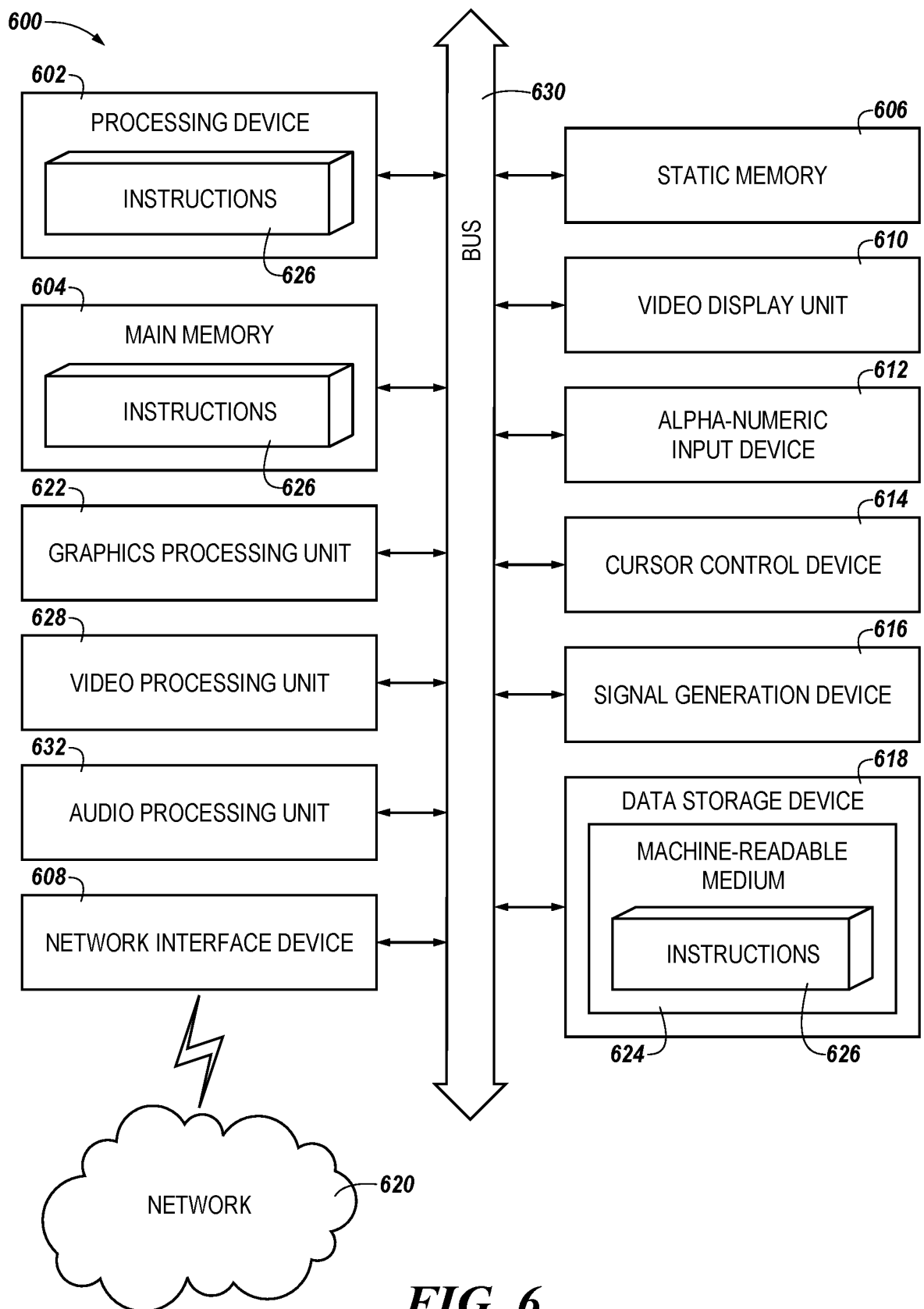
FIG. 6 is a block diagram of an example computer system in which implementations of the present disclosure may operate.

FIG. 6 illustrates an example machine of a computer system 600 within which a set of instructions, for causing the machine to perform any one or more of the methodologies discussed herein, may be executed. For example, the computer system 600 may include or utilize a storage device (e.g., storage device 116 of FIG. 1) or may be used to perform the operations of a controller (e.g., to execute an operating system to perform operations corresponding to the command processing component 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 may correspond to the storage device 116 of FIG. 1.

In one implementation, the instructions 626 include instructions to implement functionality corresponding to a command processing component (e.g., command processing component 113 of FIG. 1). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "associating" or "assigning" or "aborting" or "deleting" or "appending" or "identifying" or "comparing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
assigning a port revision identifier to a command, the port revision identifier corresponding to a port of a storage system;
assigning an updated port revision identifier to the port to replace the port revision identifier; and
aborting execution of the command while the command is being processed responsive to determining that the port revision identifier associated with the command is different than the updated port revision identifier of the port.

2. The method of claim 1, further comprising assigning the updated port revision identifier to the port in response to a status change of the port.

3. The method of claim 2, wherein the status change comprises at least one of a disconnect between the host and the port, a restart of the host, a failure related to the port, or a failure related to the host.

4. The method of claim 1, wherein assigning the updated port revision identifier to the port comprises incrementing the port revision identifier.

5. The method of claim 1, wherein assigning the port revision identifier to the command comprises appending the port revision identifier to the command.

6. The method of claim 1, wherein the port is a single root input/output virtualization virtual function.

7. An apparatus, comprising:
a memory device having a processing device and at least one port, wherein the processing device is configured to:
assign a port revision identifier to a command, the port revision identifier corresponding to the port;
assign an updated port revision identifier to the port to replace the port revision identifier; and
abort execution of the command while the command is being processed responsive to determining that the port revision identifier associated with the command is different than the updated port revision identifier of the port.

8. The apparatus of claim 7, wherein the processing device is configured to abort execution of the command by deleting the command and data associated with the command.

9. The apparatus of claim 7, wherein the processing device is configured to assign an updated port revision identifier to the port to replace the port revision identifier in response to a status change of the port.

10. The apparatus of claim 9, wherein the status change comprises at least one of a disconnect between the host and the port, a restart of the host, a failure related to the port, or a failure related to the host.

11. The apparatus of claim 7, wherein the processing device is configured to cause the port revision identifier to be incremented to generate the updated port revision identifier.

12. The apparatus of claim 7, wherein the processing device is configured to cause the updated port revision identifier to be appended to a command generated subsequent to the command being aborted.

13. The apparatus of claim 7, wherein the processing device is further configured to:
compare the port revision identifier assigned to the command to a port revision identifier assigned to the port; and
abort execution of the command in response to a determination that the port revision identifier assigned to the command and the port revision identifier assigned to the port do not match.

14. A system, comprising:
a memory device;
a port; and
a processing device coupled with the memory device and port, the processing device to:
assign a port revision identifier to a command, the port revision identifier corresponding to the port;
assign an updated port revision identifier to the port to replace the port revision identifier; and
abort execution of the command while the command is being processed responsive to determining that the port revision identifier associated with the command is different than the updated port revision identifier of the port.

15. The system of claim 14, wherein the processing device is configured to assign the updated port revision identifier to the port in response to a status change associated with the port.

16. The system of claim 15, wherein the status change comprises at least one of a disconnect between the host and the port, a restart of the host, a failure related to the port, or a failure related to the host.

17. The system of claim 14, wherein the port is coupled to a host via a physical Peripheral Component Interconnect Express (PCIe) command path.

18. The system of claim 14, wherein the processing device is further configured to:
compare the port revision identifier assigned to the command to a port revision identifier assigned to the port; and
abort execution of the command in response to a determination that the port revision identifier assigned to the command and the port revision identifier assigned to the port do not match.

19. The system of claim 14, wherein the command is received by the port via a logical path coupling the port of the memory device to a non-volatile memory of the storage system.

20. The system of claim 14, wherein the processing device is configured to abort execution of the command by deleting the command and data associated with the command.

* * * * *